J. DUPUIS.
LET-OFF MECHANISM FOR LOOMS.
APPLICATION FILED APR. 24, 1915.
1,254,127.
Patented Jan. 22, 1918.
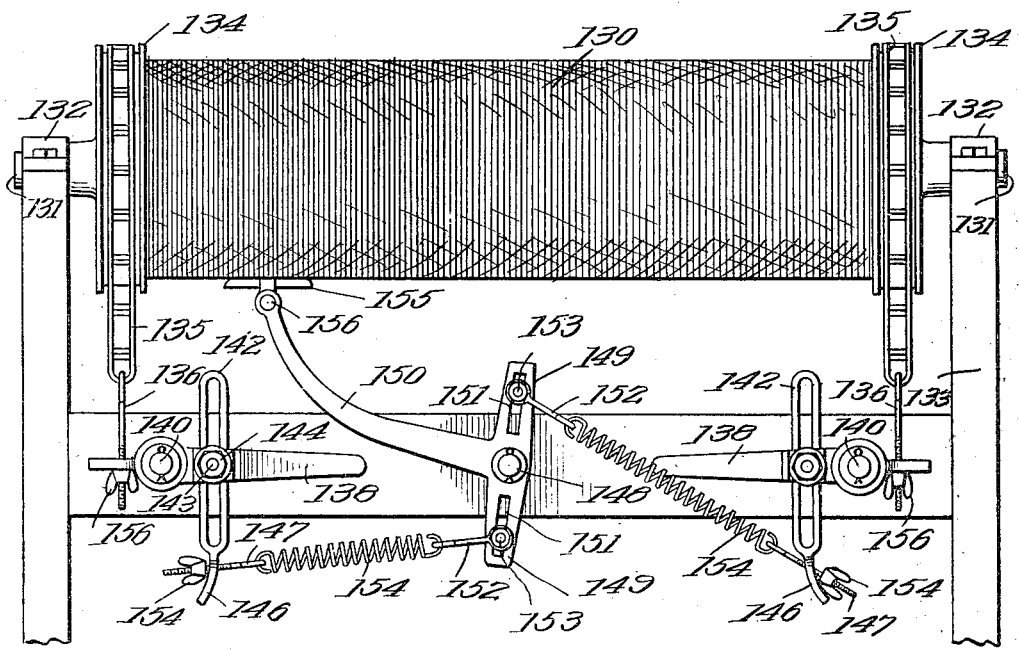
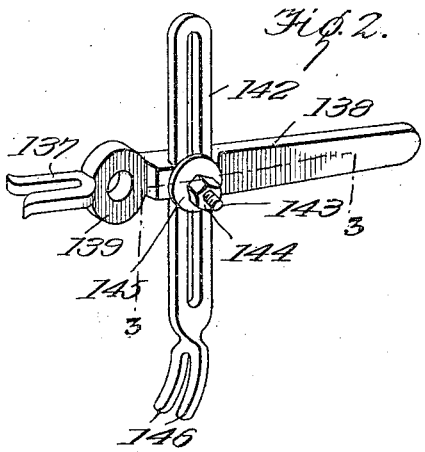
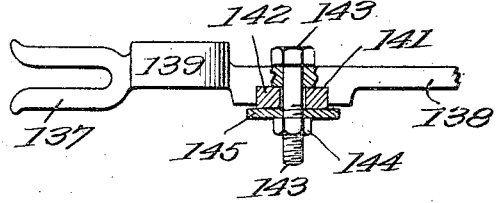
WITNESSES:
INVENTOR
JOSEPH DUPUIS,
ATTORNEYS

UNITED STATES PATENT OFFICE.

JOSEPH DUPUIS, OF FALL RIVER, MASSACHUSETTS.

LET-OFF MECHANISM FOR LOOMS.

1,254,127.

Specification of Letters Patent.

Patented Jan. 22, 1918.

Application filed April 24, 1915. Serial No. 23,687.

*To all whom it may concern:*

Be it known that I, JOSEPH DUPUIS, a citizen of the United States, and a resident of Fall River, in the county of Bristol and State of Massachusetts, have invented a new and useful Improvement in Let-Off Mechanism for Looms, of which the following is a specification.

My invention is an improvement in machine brakes, and has for its object to provide a device of the character specified, for automatically varying the tension on the warp roller of a loom in accordance with the varying conditions to which the roller is subjected as the warp is drawn off to provide for a continuous uniform web, which will be smooth and free from knots and roughness.

In the drawings:—

Figure 1 is a front view of an embodiment of the invention;

Fig. 2 is a perspective view of one of the levers, and

Fig. 3 is a section on the line 3—3 of Fig. 2.

While the invention is shown in connection with the warp roller or reel of a loom, it will be obvious that it is equally well adapted for use with any machine or mechanism, wherein a brake is desired that will operate automatically in accordance with the conditions to which the roller or reel is subjected.

In the embodiment of the invention shown in Figs. 1 to 3, the warp roller 130 has its journal pins 131 journaled in bearings 132 on the frame 133, and the brake disks or wheels 134 at the ends of the roller have coöperating therewith the brake chains 135. Each chain has one end connected to the frame in any suitable manner, and the other end of each chain is connected to a hook or eye on the upper end of a bolt 136.

The lower end of the bolt passes between the arms of a fork 137 on a lever 138. The lever is provided with a bearing 139 between the fork and the body of the lever, and this bearing of each lever is journaled on a journal pin 140 extending laterally from the frame of the loom and connected thereto in any manner, as for instance by means of a slot to form an adjustable connection.

The lever 138 is grooved vertically adjacent to the bearing as indicated at 141, and a slotted arm 142 is mounted to slide vertically in the slot. A bolt 143 is passed through an opening in the lever 138, and through the slot of the slotted arm, and the bolt is engaged by a nut 144 to hold the parts in place.

A washer 145 is arranged on the bolt between the nut and the inner face of the slotted arm, and the nut and bolt slidably connect the slotted arm to the lever. The lower end of arm 142 is provided with a fork 146, and the fork of each arm is engaged by an eye bolt 147, each eye bolt being passed between the arms of the adjacent fork.

A three armed rock lever is journaled on the frame of the loom between the levers 138 on a journal pin 148, and the rock lever is provided with oppositely extending similar arms 149, and with a curved arm 150. The arms 149 are longitudinally slotted as shown at 151, and a clip 152 is adjustably connected with each slot by means of a bolt and nut 153.

A coil spring 154 connects each clip with the adjacent eye bolt 147, and a wing nut 154 is threaded on each eye bolt 147 on the opposite side of the fork from the coil spring 154. Each of the coil springs as shown has hooks at its ends, one hook engaging the eye bolt 147 and the other the clip 152. The arms 149 of the three armed rock lever extend approximately vertical while the arm 150 curves laterally and upwardly and the free end is provided with a brake shoe 155, which is pivoted to the arm as indicated at 156, and the shoe engages the warp on the warp roller.

The operation is as follows:—

The parts are adjusted properly to provide the proper amount of friction with the warp roller filled. As the warp decreases on the roller the three armed rock lever swings on its pivotal mounting, decreasing the tension on the springs 154 since the brake shoe 155 moves upward. The upward movement of the arm 150 permits the arms 149 to move toward the levers 138 to which they are indirectly connected, thus decreasing the tension on the springs 154, and decreasing at the same time the tension of the brake bands on the brake wheels.

It will be understood that when the warp roller is full a greater braking stress is necessary than when the roller is partially empty. It will be evident that when the warp roller is filled a larger amount of warp is withdrawn at each complete rotation than when several layers of warp have been removed for instance, and with every layer that is removed the tension of the brake bands is decreased.

It will be evident from the description that by means of the wing nuts 154 and the bolts 153 the tension of the springs 154 may be varied. The bolt 143 and the nut 144 permit the connection between the slotted arm and the lever 138 to be varied, and the lower end of each eye bolt 136 which passes between the arms of the fork 137 of the adjacent lever 138 has a wing nut 156 threaded thereon. By means of this nut the connection between the brake band and the lever 138 may be varied.

To move the slotted arm vertically it is only necessary to loosen the nut 144. To vary the connection of either clip 152 with the adjacent arm 149 of the rock lever it is only necessary to release the nut of the bolt 153. It will be understood that ordinarily the clips are adjusted together, and are similarly arranged with respect to the journal pin 148.

In the above construction the brake action is automatically controlled by the amount of warp on the roller.

I claim:—

The combination with the warp roller and the brake mechanism for braking the action thereof, of means operated by the depth of the warp on the roller and controlling the said mechanism, said means comprising a rock lever pivoted adjacent to the roller and having one arm provided with a shoe engaging the warp of the roller, an elbow lever pivoted adjacent to each end of the warp roller and having an arm connected with the brake mechanism for controlling the same, an adjustable connection between the other arm of each elbow lever and the rock lever for simultaneously operating the said levers in the same direction when the rock lever is rocked, and a spring interposed in the said connection, each elbow lever having means in connection therewith for varying the length of one of the arms.

JOSEPH DUPUIS.

Copies of this patent may be obtained for five cents each, by addressing the "Commissioner of Patents, Washington, D. C."